Patented Sept. 2, 1952

2,609,360

UNITED STATES PATENT OFFICE 2,609,360

PROCESS OF REACTING POLYVINYLALCOHOL WITH UREA PHOSPHATE

George C. Daul and John D. Reid, New Orleans, La., assignors to the United States of America as represented by the Secretary of Agriculture No Drawing. Application April 25, 1950, Serial No. 158,053

3 Claims. (Cl. 260—80)

(Granted under the act of March 3, 1883, as amended April 30, 1928; 370 O. G. 757)

This invention relates to a novel process for the preparation of polyvinyl phosphates and to the production of a material valuable as an intermediate in the manufacture of high capacity cation-exchange materials. It has among its objects the production of water-soluble polyvinyl phosphate valuable as an agency for the phosphorylation of cellulosic materials and also the polymerization of polyvinyl phosphates for use as a cation-exchange material.

Polyvinyl alcohol has been phosphorylated by a method employing phosphoric acid and phosphorus pentoxide reacting for 3 days with polyvinyl alcohol. (R. E. Ferrel, H. S. Olcott and H. Fraenkel-Conrat, Journal of the American Chemical Society, 70, 2101 (1948)). However, we find that this process tends to produce a water-insoluble compound unsuited for further reaction with other materials, as, for example, cellulose, and furthermore is time consuming and expensive.

We have discovered that water-soluble phosphates of polyvinyl alcohol may be produced by the reaction of polyvinyl alcohol with urea phosphate as hereinafter described, and that these phosphates when heated are capable of self-polymerization, without aid of a catalyst, to form high-capacity ion-exchange substances, and moreover are capable of undergoing a reaction (as the ammonium or urea salt) with cellulosic materials such as cotton fibers, alpha cellulose and the like to produce valuable derivatives of cellulose.

We have found that while polyvinyl alcohol in water solution is thrown out of solution by ammonium phosphate, it remains in solution when urea phosphate is added to it and such solution is conveniently used in our preparation. According to our invention, polyvinyl alcohol, of high, intermediate or low viscosity, is heated with urea phosphate to a temperature within the range of 130° C. to 160° C. for 10 to 30 minutes. This period of heating, after evaporation of excess water, decomposes the urea phosphate to yield biuret, ammonia, phosphoric acid, and other products. The acid is liberated in such a way that it enters into esterification reaction with the polyvinyl alcohol, easily and with a minimum of cross-linkage formation.

The time of heating varies substantially with the temperature employed after preliminary evaporation of excess water. At temperatures near the low limit, the reaction proceeds relatively slowly, while at temperatures near the upper limit the reaction proceeds rapidly but a tendency for pyrolysis of the polyvinyl alcohol begins to occur. The degree of phosphorylation may be controlled somewhat by varying the molecular proportions of the reactants. It is nevertheless desirable to employ a small excess of urea phosphate over and above the desired reacting proportion. The urea phosphate is preferably added in the form of its concentrated aqueous solution, say about 85% concentration or alternatively the urea and phosphoric acid may be added separately to the reaction mixture.

To insure thorough mixing of the reactants, it is preferable to add water, particularly when a high viscosity polyvinyl alcohol is being phosphorylated. The amount of water added may conveniently vary from 5 to 50 percent based on the weight of the reaction mixture. For practical reasons, the water content should be kept at the minimum required to give a uniform mixture of reactants as it must be evaporated during the process. The heating is carried out for about 10 to 30 minutes after the excess water has been evaporated.

One particular advantage of our process lies in the fact that the reaction mechanism involved permits a high degree of phosphorylation in which the phosphoric acid is practically all singly bound with little cross-linkage. For example, in a product possessing a ratio of phosphoric acid groups to ethylene groups of 2:3, conductometric titrations showed that substantially all of the phosphorus was singly bound. This corresponds approximately to the following formula where the monoammonium phosphoric acid ester is shown:

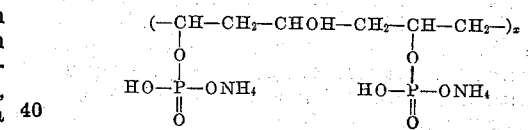

The diammonium salt loses ammonia rather easily, similarly to diammonium phosphate. The reaction product, in its crude form, may be dissolved in water and employed as an intermediate for further reaction with cellulosic material or for other purposes. However, it may be purified by dissolving the mixture in water and subsequently precipitating polyvinyl phosphate as its ammonium salt by the addition of acetone. Alternatively, the crude reaction product may be purified by extraction with acetone to remove excess phosphoric acid and urea. Dialysis may be employed for purification, or other selective solvents such as dioxane may be used, choice of which will readily occur to those skilled in the art. The material has many of the usual properties of a dibasic acid and salts are easily prepared by cation-exchange. The free acid may be prepared by acidification of the ammonium salt solution, for example with hydrochloric acid, and the free acid precipitated with acetone.

The polyvinyl phosphate, produced in accordance with our process may be polymerized by heating to a temperature within the range of 110 to 180° C. for 30 minutes to one hour or more, the degree of polymerization varying with the time and temperature employed. This self-polymerization may include some cross-linkage of phosphoric acid groups with unreacted polyvinyl hydroxyl groups. However, it is more likely that the polymerization involves the unsaturated vinyl groups. The polyvinyl phosphate is also capable of undergoing reaction with cellulosic material and this may be accomplished as described in copending application No. 158,054, filed on April 25, 1950. Moreover, it may be polymerized on inert materials, such as glass fabric, generally with higher temperature than that required for reaction with cellulose.

We have also found that polyvinyl alcohol may be phosphorylated by the use of a number of common phosphorylating agents such as phosphorus oxychloride. In this case, however, it is difficult to avoid cross-linkage due to reaction of more than one of the chlorine atoms with hydroxyl groups, and in this reaction it is necessary to hydrolyze off the residual chlorines on the product to obtain acid groups. This cross-linkage plus further polymerization of vinyl groups tends to give insoluble products which limits their usefulness to cases where this does not interfere, as for example, the production of high-capacity water-insoluble cation-exchange material.

The following examples illustrate the invention:

Example 1

Sixty grams of 85% orthophosphoric acid and 60 grams of urea were heated to solution and 25 grams of low-viscosity polyvinyl alcohol dusted in and mixed thoroughly to give a pasty mixture. This was spread thinly in a flat pan and heated at 150° C. for 15 minutes in an oven with air circulation. The product expanded greatly due to the production of ammonia. After the reaction, the cooled, dry product was ground to a powder and extracted in a Soxhlet apparatus for 8 hours with acetone to remove by-products. It contained, by analysis, 17.9% phosphorus and 7.4% nitrogen, which corresponds approximately to 5 phosphoric groups per nine vinyl groups. The monoammonium salt of polyvinyl phosphoric acid with like substitution would contain 17.6% phosphorus and 8.0% nitrogen.

Example 2

Three hundred grams of orthophosphoric acid (85%) and 175 grams of urea were mixed and warmed to solution, to this was added 100 grams of polyvinyl alcohol dissolved in 300 ml. of water. These materials were mixed to a smooth paste and spread on a pan. It was heated in an oven with air-circulation at 110° C. with occasional stirring for three hours to evaporate excess water, then heated at 150° C. for 15 minutes. A part of the crude, dry product was removed for further experiments. The balance of the product was dissolved in water, precipitated in acetone, and dried under vacuum. It was then ground and extracted with acetone in a Soxhlet extractor for eight hours. The phosphorus content of this product was 19.6% and the nitrogen content 9.8%. For a substitution of 3 acid groups per 4 vinyl groups, the monoammonium salt of polyvinyl phosphoric acid would have a phosphorus content of 19.9% and a nitrogen content of 9.0%.

Example 3

Thirty grams of the crude product of Example 2 were dissolved in 70 ml. of water and padded on cotton cloth to about 100% takeup of liquid to weight of cloth. The cloth was baked at 150° C. for 15 minutes, washed thoroughly with water containing 5% ammonium hydroxide, then with hot distilled water. The product has increased in weight 22.4% and contained 3.9% phosphorus. Converted to the acid form with dilute hydrochloric acid, it had a cation-exchange capacity of 1030 m.e./kg. (based on acid liberated from calcium chloride. Reference: Journal of the American Waterworks Assn. 35, 721–50, 1943.) The total cation-exchange capacity (sodium hydroxide removed from 0.1 N solution) was 2100 m.e./kg.

Example 4

Twenty grams of the product of Example 1 and 20 grams of urea was made into solution with 80 ml. water and padded on cotton, nylon, and cellulose acetate tapes. Glass tape was soaked and drained of excess to approximately the same pickup as the other materials. The tapes were cured at 150° C. for 15 minutes. After thorough washing and drying, the cellulose acetate had gained no weight, the nylon gained only 0.7%, the glass 0.9%, and the cotton 7.8%. This indicated a reaction between the cotton and the polyvinyl phosphoric acid ester. As disclosed in the copending application referred to above, a non-reacting surface coating can be formed upon cotton by polymerizing at temperatures of about 110° C., being below that required for the reaction with cellulose.

Example 5

The experiment in Example 4 was repeated except the curing time was increased to one hour. In this case the cotton gained 12.0%, nylon 11.0%, cellulose acetate 13.9%, and glass 10.4%. This indicated that polyvinyl phosphate will polymerize on substances other than cellulose at longer periods of heating than that required for reaction with cellulose.

Example 6

One hundred grams of high-viscosity polyvinyl alcohol was added in about 10 g. portions to 245 ml. of phosphorus oxychloride in 500 ml. of chloroform with vigorous agitation and cooling with ice water. Stirring was continued for one hour after the final addition of polyvinyl alcohol and cooling was discontinued. The liquid was drained from the solid product which was then dropped in small portions into ice water. It was then filtered and placed into hot water to hydrolyze chlorine. It was neutralized with ammonium hydroxide, washed thoroughly with water, acidified with hydrochloric acid and then washed with distilled water until free of excess acid.

The washed product, which was in a highly swollen, granular state, was dried on trays in a blower oven. The phosphorus content was 13.4%. Total cation-exchange capacity by titration with 0.1 N sodium hydroxide was 4470 m. e./kg.

*Example 7*

Twenty grams of the product of Example 2 were heated at 110° C for 12 hours. The brown, granular product was insoluble in water. It was washed with 5% hydrochloric acid, then washed free of excess. Total cation-exchange capacity was 4470 m. e./kg.

The invention herein described may be manufactured and used by or for the Government of the United States of America for governmental purposes throughout the world, without the payment to us of any royalty thereon.

Having thus described our invention, we claim:

1. In a process for preparing polyvinyl phosphate, the steps which comprise heating an aqueous mixture of polyvinyl alcohol and urea phosphate to a temperature within the range of 130° C. to 160° C. until evolution of water vapor ceases, dissolving the reaction mixture in water, adding acetone, and acidifying the thus precipitated ammonium salt of polyvinyl phosphate.

2. A process of preparing water-soluble ammonium hydrogen orthophosphate polyester of polyvinyl alcohol, comprising heating an aqueous mixture of urea phosphate and polyvinyl alcohol at no higher than about 160° C., until the evaporation of water vapor ceases, dissolving the reaction mixture in water and precipitating with acetone.

3. A process of esterifying polyvinyl alcohol with orthophosphoric acid which comprises heating an aqueous mixture of polyvinyl alcohol and urea phosphate to a temperature within the range of 130° C. to 160° C. until the evolution of water vapor ceases and the reaction is substantially complete.

GEORGE C. DAUL.
JOHN D. REID.

REFERENCES CITED

The following references are of record in the file of this patent:

UNITED STATES PATENTS

| Number | Name | Date |
|---|---|---|
| 1,835,619 | Walsh | Dec. 8, 1931 |
| 2,495,108 | Kosolapoff | Jan. 17, 1950 |
| 2,497,637 | Fon Toy | Feb. 14, 1950 |

OTHER REFERENCES

Katchalsky: Nature, page 267 (August 12, 1950).

Ferrel et al., J. Am. Chem. Soc., 70, 2101–2107, especially 2103 (Table II) and 2104 (1948).